United States Patent
Chen et al.

(10) Patent No.: US 11,842,535 B2
(45) Date of Patent: Dec. 12, 2023

(54) SYSTEMS AND METHODS FOR LICENSE PLATE RECOGNITION

(71) Applicant: ZHEJIANG DAHUA TECHNOLOGY CO., LTD., Zhejiang (CN)

(72) Inventors: Yichao Chen, Hangzhou (CN); Yaonong Wang, Hangzhou (CN); Jun Yin, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 166 days.

(21) Appl. No.: 17/340,213

(22) Filed: Jun. 7, 2021

(65) Prior Publication Data

US 2021/0295080 A1     Sep. 23, 2021

Related U.S. Application Data

(63) Continuation of application No. PCT/CN2018/125762, filed on Dec. 29, 2018.

(51) Int. Cl.
*G06V 20/00*     (2022.01)
*G06T 3/60*     (2006.01)
(Continued)

(52) U.S. Cl.
CPC .............. *G06V 20/00* (2022.01); *G06T 3/60* (2013.01); *G06V 10/22* (2022.01); *G06V 10/242* (2022.01);
(Continued)

(58) Field of Classification Search
CPC ...... G06V 20/00; G06V 10/22; G06V 10/242; G06V 10/243; G06V 10/44; G06V 20/54; G06V 20/62; G06T 3/60
(Continued)

(56) References Cited

U.S. PATENT DOCUMENTS

2013/0204719 A1    8/2013   Burry et al.
2013/0279758 A1*   10/2013   Burry ..................... G06V 30/15
                                                              382/105
(Continued)

FOREIGN PATENT DOCUMENTS

CN    103093200 A    5/2013
CN    104318233 A    1/2015
(Continued)

OTHER PUBLICATIONS

Communication Pursuant to Article 94(3) Epc in European Application No. 18944629.7 mailed on Nov. 7, 2022, 8 pages.
(Continued)

*Primary Examiner* — Ayodeji O Ayotunde
(74) *Attorney, Agent, or Firm* — METIS IP LLC

(57) ABSTRACT

A system and method for license plate recognition is provided in the present disclosure. The method may include obtaining an image including a license plate mounted on a vehicle, and identifying at least one feature point associated with the vehicle. The method may also include determining an approximate angle range within which a tilt angle of the license plate is located based on the at least one feature point, and determining the tilt angle of the license plate within the approximate angle range. The method may further include performing a tilt correction on the license plate based on the tilt angle of the license plate.

20 Claims, 10 Drawing Sheets

(51) Int. Cl.
  *G06V 20/62* (2022.01)
  *G06V 10/24* (2022.01)
  *G06V 10/44* (2022.01)
  *G06V 10/22* (2022.01)
  *G06V 20/54* (2022.01)

(52) U.S. Cl.
  CPC ............ *G06V 10/243* (2022.01); *G06V 10/44* (2022.01); *G06V 20/54* (2022.01); *G06V 20/62* (2022.01); *G06V 10/247* (2022.01); *G06V 20/625* (2022.01)

(58) Field of Classification Search
  USPC ........................................................ 382/105
  See application file for complete search history.

(56) References Cited

U.S. PATENT DOCUMENTS

| | | | |
|---|---|---|---|
| 2013/0329961 A1* | 12/2013 | Fan | G06T 5/006 382/105 |
| 2014/0363052 A1 | 12/2014 | Kozitsky et al. | |
| 2017/0193320 A1 | 7/2017 | Wilbert et al. | |

FOREIGN PATENT DOCUMENTS

| | | |
|---|---|---|
| CN | 105608455 A | 5/2016 |
| CN | 105654083 A | 6/2016 |
| CN | 106780351 A | 5/2017 |
| CN | 106951896 A | 7/2017 |
| CN | 108805122 A | 11/2018 |
| CN | 108985137 A | 12/2018 |
| WO | 2018219054 A1 | 12/2018 |

OTHER PUBLICATIONS

He, Hongsheng et al., Recognition of Car Makes and Models from a Single Traffic-Camera Image, IEEE Transactions on Intelligent Transportation Systems, 16(6): 3182-3192, 2015.

Xu, Xiaowei et al., A Method of Multi-view Vehicle License Plates Location Based on Rectangle Features, ICSP2006 Proceedings, 2006, 4 pages.

The Extended European Search Report in European Application No. 18944629.7 dated Oct. 1, 2021, 9 pages.

International Search Report in PCT/CN2018/125762 dated Sep. 30, 2019, 5 pages.

Written Opinion in PCT/CN2018/125762 dated Sep. 30, 2019, 3 pages.

Mei-Sen Pan et al., A New Method for Correcting Vehicle License Plate Tilt, International Journal of Automation and Computing, 6(2): 210-211, 2009.

Mahendra Prajapati et al., Position Detection of a Moving Vehicle using Images, Proceedings of Second International Conference on Signals, Systems & Automation (ICSSA-11), 2011, 6 pages.

Kaushik Deb et al., Vehicle License Plate Tilt Correction Based on the Straight Line Fitting Method and Minimizing Variance of Coordinates of Projection Points, International Journal of Control, Automation, and Systems, 8(5): 975-984, 2010.

Ronak P Patel et al., Automatic Licenses Plate Recognition, International Journal of Computer Science and Mobile Computing, 2(4): 285-294, 2013.

Ondrej Martinsky, Algorithmic and Mathematical Principles of Automatic Number Plate Recognition Systems, Brno University of Technology, 2007, 83 pages.

Yuan, Jie et al., Fast Super-resolution for License Plate Image Reconstruction, International Conference on Pattern Recognition, 2008, 4 pages.

Wong Weng Keong et al., Malaysian Automatic No. Plate Recognition System using Pearson Correlation, 2016 IEEE Symposium on Computer Applications & Industrial Electronics (ISCAIE), 2016, 6 pages.

"A New Method for Tilt Correction of License Plate Image Based on LS-SVM", web page <https://www.eefocus.com/automobile-electronics/278842>, Jul. 12, 2011.

"Technical Post: Explain in Detail What is the License Plate Recognition Algorithm!", web page <https://zhuanlan.zhihu.com/p/26983712>, May 18, 2017.

* cited by examiner

500

```
┌─────────────────────────────────────────────────┐
│ Obtaining an image including a reference zone,  │
│ the reference zone including at least part of a │──510
│ vehicle having a license plate                  │
└─────────────────────────────────────────────────┘
                        ▼
┌─────────────────────────────────────────────────┐
│ Identifying at least one feature point          │──520
│ associated with the vehicle                     │
└─────────────────────────────────────────────────┘
                        ▼
┌─────────────────────────────────────────────────┐
│ Determining, based on the at least one feature  │──530
│ point, an angle range of the license plate      │
└─────────────────────────────────────────────────┘
                        ▼
┌─────────────────────────────────────────────────┐
│ Determining a tilt angle of the license plate   │──540
│ within the angle range                          │
└─────────────────────────────────────────────────┘
                        ▼
┌─────────────────────────────────────────────────┐
│ Performing a tilt correction on the license     │──550
│ plate                                           │
└─────────────────────────────────────────────────┘
                        ▼
              ◇ A reconstruction of the ◇──560
         No  ◇ corrected license plate  ◇
         ┌───◇      is needed?          ◇
         │    ◇                         ◇
         │              │ Yes
         │              ▼
         │  ┌─────────────────────────────────────┐
         │  │ Performing the reconstruction of    │──570
         │  │ the corrected license plate         │
         │  └─────────────────────────────────────┘
         │              │
         │              ▼
         │  ┌─────────────────────────────────────┐
         └─▶│ Extracting information of the       │──580
            │ license plate                       │
            └─────────────────────────────────────┘
```

┌─────────────────────────────────────────┐
│ Obtain an angle range of a license plate in an │ ～ 710
│ image │
└─────────────────────────────────────────┘
                    ↓
┌─────────────────────────────────────────┐
│ Identifying a plurality of reference points of the │ ～ 720
│ license plate │
└─────────────────────────────────────────┘
                    ↓
┌─────────────────────────────────────────┐
│ Determining, for each of a plurality of candidate │
│ angles in the angle range, a plurality of projection │ ～ 730
│ points based on the plurality of reference points │
└─────────────────────────────────────────┘
                    ↓
┌─────────────────────────────────────────┐
│ Determining, for each of the plurality of candidate │
│ angles in the angle range, a variance of the │ ～ 740
│ plurality of projection points │
└─────────────────────────────────────────┘
                    ↓
┌─────────────────────────────────────────┐
│ Designating, based on the plurality of variances, │
│ one of the plurality of candidate angles as a tilt │ ～ 750
│ angle of the license plate │
└─────────────────────────────────────────┘

FIG. 7

SYSTEMS AND METHODS FOR LICENSE PLATE RECOGNITION

CROSS-REFERENCE TO RELATED APPLICATIONS

This application is a Continuation of International Application No. PCT/CN2018/125762, filed on Dec. 29, 2018, the entire contents of which are hereby incorporated by reference.

TECHNICAL FIELD

This disclosure generally relates to methods and systems for object recognition, and more particularly, to methods and systems for license plate recognition.

BACKGROUND

Nowadays, the field of computer based image and video analysis has progressed to tackle monitoring task in an automated manner. Especially, vehicle monitoring based on image processing has become an interesting topic. To monitor a vehicle, it is of particular interest to recognize the license plate mounted on the vehicle. In some embodiments, the appearance of the license plate in the image may be subject to a deformation due to, for example, a tilt of the license plate. To better recognize the license plate in the image, it is desired to provide a system and method to efficiently identify the tilt angle of the license plate and correct the license plate thereafter.

SUMMARY

An aspect of the present disclosure relates to a system for license plate recognition. The system may include at least one storage medium including a set of instructions, and at least one processor in communication with the at least one storage medium. When executing the set of instructions, the at least one processor is directed to cause the system to obtain an image including a license plate mounted on a vehicle, and identify at least one feature point associated with the vehicle. The at least one processor is also directed to cause the system to determine an approximate angle range within which a tilt angle of the license plate is located based on the at least one feature point, and determine the tilt angle of the license plate within the approximate angle range. The at least one processor is further directed to cause the system to perform a tilt correction on the license plate based on the tilt angle of the license plate.

In some embodiments, the at least one feature point associated with the vehicle may include a first feature point located at the license plate and at least one second feature point located at the vehicle and outside the license plate.

In some embodiments, the first feature point located at the license plate may include a center point of the license plate.

In some embodiments, the at least one second feature point located at the vehicle and outside the license plate may include a second feature at a left boundary of the vehicle and a second feature at a right boundary of the vehicle.

In some embodiments, to determine an approximate angle range within which a tilt angle of the license plate is located, the at least one processor is directed to cause the system to determine an approximate tilt angle based on a position relation between the first feature point and the at least one second feature point, and determine the approximate angle range based on the approximate tilt angle.

In some embodiments, the approximate tilt angle may be the median of the approximate angle range.

In some embodiments, to determine the tilt angle of the license plate within the approximate angle range, the at least one processor is directed to cause the system to identify a plurality of reference points of the license plate, and determine a parameter value associated with the plurality of reference points of the license plate for each of a plurality of candidate angles in the approximate angle range. The at least one processor is further directed to designate one of the plurality of candidate angles as the tilt angle of the license plate based on the plurality of parameter values.

In some embodiments, the parameter value associated with the plurality of reference points of the license plate may be a variance of a plurality of projection points that are projected by the plurality of reference points.

In some embodiments, the at least one processor is further directed to cause the system to reconstruct the corrected license plate in response to a determination that the license plate needs reconstruction.

In some embodiments, the reconstruction of the corrected license plate may include an adjustment of a size of the corrected license plate.

Another aspect of the present disclosure relates to a method for license plate recognition. The method may be implemented on a computing device including at least one processor and at least one storage medium. The method may include obtaining an image including a license plate mounted on a vehicle, and identifying at least one feature point associated with the vehicle. The method may also include determining an approximate angle range within which a tilt angle of the license plate is located based on the at least one feature point, and determining the tilt angle of the license plate within the approximate angle range. The method may further include performing a tilt correction on the license plate based on the tilt angle of the license plate.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein:

FIG. 5 is a flow chart illustrating an exemplary process for license plate recognition according to some embodiments of the present disclosure;

FIG. 7 is a flow chart illustrating an exemplary process for determining a tilt angle of a license plate according to some embodiments of the present disclosure;

DETAILED DESCRIPTION

Figure 1:
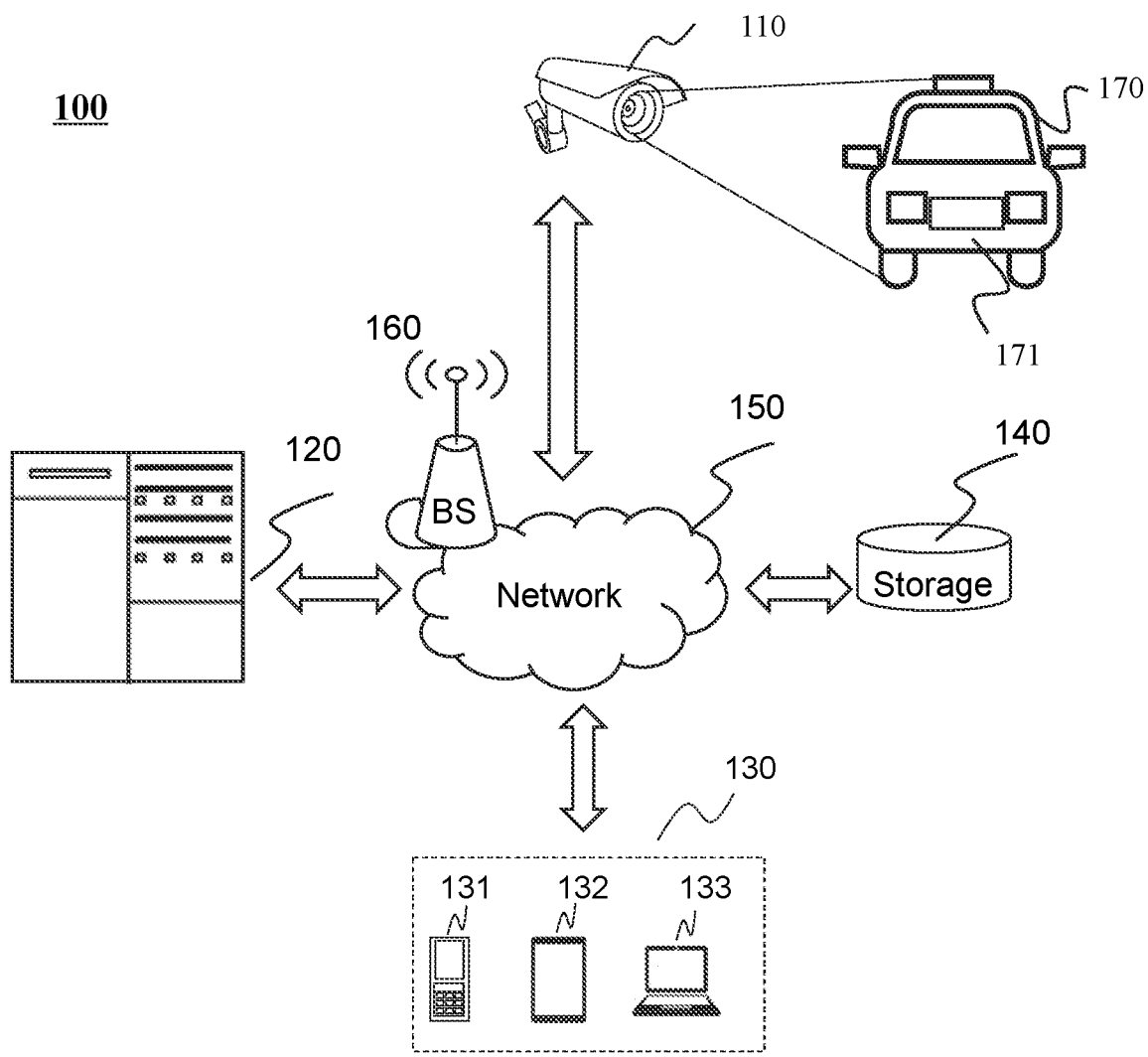
FIG. 1 is a schematic diagram illustrating an exemplary license plate recognition system according to some embodiments of the present disclosure.

In order to illustrate the technical solutions related to the embodiments of the present disclosure, brief introduction of the drawings referred to in the description of the embodiments is provided below. Obviously, drawings described below are only some examples or embodiments of the present disclosure. Those having ordinary skills in the art, without further creative efforts, may apply the present disclosure to other similar scenarios according to these drawings. Unless stated otherwise or obvious from the context, the same reference numeral in the drawings refers to the same structure and operation.

As used in the disclosure and the appended claims, the singular forms "a," "an," and "the" include plural referents unless the content clearly dictates otherwise. It will be further understood that the terms "comprises," "comprising," "includes," and/or "including" when used in the disclosure, specify the presence of stated steps and elements, but do not preclude the presence or addition of one or more other steps and elements.

Some modules of the system may be referred to in various ways according to some embodiments of the present disclosure, however, any number of different modules may be used and operated in a client terminal and/or a server. These modules are intended to be illustrative, not intended to limit the scope of the present disclosure. Different modules may be used in different aspects of the system and method.

According to some embodiments of the present disclosure, flow charts are used to illustrate the operations performed by the system. It is to be expressly understood, the operations above or below may or may not be implemented in order. Conversely, the operations may be performed in inverted order, or simultaneously. Besides, one or more other operations may be added to the flowcharts, or one or more operations may be omitted from the flowchart.

Technical solutions of the embodiments of the present disclosure be described with reference to the drawings as described below. It is obvious that the described embodiments are not exhaustive and are not limiting. Other embodiments obtained, based on the embodiments set forth in the present disclosure, by those with ordinary skill in the art without any creative works are within the scope of the present disclosure.

An aspect of the present disclosure relates to systems and methods for recognizing a license plate in an image of a vehicle. The systems may determine an approximate angle range of the license plate and locate a tilt angle of the license plate within the approximate angle range. The approximate angle range may be an angle range covering an approximate tilt angle of the license plate. The approximate tilt angle may relate to an orientation of the vehicle in the image and be determined according to at least one feature point (e.g., the feature point(s) of the license plate, the feature point(s) of other parts of the vehicle other than the license plate). The systems may further perform a tilt correction on the license plate based on the tilt angle of the license plate. In some embodiments, the systems may further reconstruct the corrected license plate to facilitate the subsequent process of license plate recognition.

FIG. 1 is a schematic diagram illustrating an exemplary license plate recognition system 100 according to some embodiments of the present disclosure. The license plate recognition system 100 may recognize a license plate of a vehicle in an image. As illustrated in FIG. 1, the license plate recognition system 100 may include an imaging device 110, an image processing device 120, a terminal 130, a storage 140, a network 150, and/or any other suitable component in accordance with various embodiments of the disclosure.

The imaging device 110 may be a device configured to capture one or more images. As used in this application, an image may be a still image, a video, a stream video, or a video frame obtained from a video. The one or more images may include an image of a vehicle 170 with a license plate 171 on it. The vehicle 170 in the image may be presented with various views, such as, a front view, a lateral view, a perspective view, etc.

In some embodiments, the imaging device 110 may be a camera, a smart phone, a tablet, a laptop, a video gaming console equipped with a web camera, etc. The camera may be a static camera, a pan-tilt-zoom camera, a moving camera, a stereoscopic camera, a structured light camera, a time-of-flight camera, etc. Specifically, the imaging device 110 may be a camera equipped with a time-of-flight device, a Kinect sensor, a 3D laser scanner, a photographic scanner, etc. The types of the imaging device 110 may be different, depending on the installation location and/or the type of objects to be captured.

The image(s) generated by the imaging device 110 may be stored in the storage 140, and/or sent to the image processing device 120, or the terminal 130 via the network 150.

The image processing device 120 may process an image generated by the imaging device 110 or retrieved from another component in the license plate system 100 (e.g., the storage 140, the terminal 130). For example, the image processing device 120 may identify a position or an orientation of the vehicle 170 in the image. Additionally, the image processing 120 may identify the license plate 171 on the vehicle 170 and recognize the text information on the license plate 171. Specifically, the image processing device 120 may perform a vehicle recognition algorithm to position the vehicle 170 in the image, and further determine a tilt angle of the license plate 171 according to one or more feature points of the vehicle 170.

In some embodiments, the image processing device 120 may generate a control signal based on, for example, a feature of an object (e.g., the vehicle 170), an image of an object, a video of an object, or the like, or a combination. The control signal may be used to control the imaging device 110. For example, the image processing device 120 may generate a control signal to control the imaging device 110 (e.g., a camera) to track an object and obtain an image of the object.

In some embodiments, the image processing device 120 may include one or more processing engines (e.g., single-core processing engine(s) or multi-core processor(s)). Merely by way of example, the image processing device 120 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

The terminal 130 may be connected to or communicate with the image processing device 120. The terminal 130 may allow one or more operators (e.g., a security officer, a law enforcement officer, etc.) to control the production and/or display of the data (e.g., the image captured by the imaging device 110) on a display. The terminal 130 may include an input device, an output device, a control panel, a display (not shown in FIG. 1), or the like, or a combination thereof.

Exemplary input device may include a keyboard, a touch screen, a mouse, a remote controller, a wearable device, or the like, or a combination thereof. For example, the input device may include alphanumeric and other keys that may be inputted via a keyboard, a touch screen (e.g., with haptics or tactile feedback, etc.), a speech input, an eye tracking input, a brain monitoring system, or any other comparable input mechanism. The input information received through the input device may be communicated to the image processing device 120 via the network 150 for further processing. Exemplary input device may further include a cursor control device, such as a mouse, a trackball, or cursor direction keys to communicate direction information and command selections to, for example, the image processing device 120 and to control cursor movement on display or another display device.

A display may be configured to display the data received (e.g., the image captured by the imaging device 110). The data may include data before and/or after data processing, a request for input or parameter relating to image acquisition and/or processing, or the like, or any combination thereof. Exemplary display may include a liquid crystal display (LCD), a light emitting diode (LED)-based display, a flat panel display or curved screen (or television), a cathode ray tube (CRT), or the like, or a combination thereof.

The storage 140 may store data and/or instructions. The data may include an image (e.g., an image obtained by the imaging device 110), relevant information of the image, etc. In some embodiments, the storage 140 may store data and/or instructions that the image processing device 120 may execute or use to perform exemplary methods described in the present disclosure. In some embodiments, the storage 140 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, the storage 140 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

The network 150 may facilitate communications between various components of the license plate recognition system 100. The network 150 may be a single network, or a combination of various networks. Merely by way of example, the network 150 may include a cable network, a wireline network, an optical fiber network, a tele communications network, an intranet, an Internet, a local area network (LAN), a wide area network (WAN), a wireless local area network (WLAN), a metropolitan area network (MAN), a wide area network (WAN), a public telephone switched network (PSTN), a Bluetooth™ network, a ZigBee™ network, a near field communication (NFC) network, a global system for mobile communications (GSM) network, a code-division multiple access (CDMA) network, a time-division multiple access (TDMA) network, a general packet radio service (GPRS) network, an enhanced data rate for GSM evolution (EDGE) network, a wideband code division multiple access (WCDMA) network, a high speed downlink packet access (HSDPA) network, a long term evolution (LTE) network, a user datagram protocol (UDP) network, a transmission control protocol/Internet protocol (TCP/IP) network, a short message service (SMS) network, a wireless application protocol (WAP) network, a ultra wide band (UWB) network, an infrared ray, or the like, or any combination thereof. The network 150 may also include various network access points, e.g., wired or wireless access points such as one or more base stations 160 or Internet exchange points through which a data source may connect to the network 150 in order to transmit information via the network 150. It should be noted that the descriptions above of the license plate recognition system 100 is provided for the purposes of illustration, and not intended to limit the scope of the present disclosure. For persons having ordinary skills in the art, various variations and modifications may be conducted under the guidance of the present disclosure. However, those variations and modifications shall not depart the scope of the present disclosure. In some embodiments, the storage 140 may be combined with the image processing device 120 as a single device. Similar modifications should fall within the scope of the present disclosure.

It should be noted that the descriptions above in relation to the license plate recognition system 100 is provided for the purposes of illustration, and not intended to limit the scope of the present disclosure. For persons having ordinary skills in the art, various variations and modifications may be conducted under the guidance of the present disclosure. However, those variations and modifications do not depart the scope of the present disclosure. For example, part or all of the image data generated by the imaging device 110 may be processed by the terminal 130. As another example, the imaging device 110 and the image processing device 120 may be implemented in one single device configured to perform the functions of the imaging device 110 and the image processing device 120 described in this disclosure. As still another example, the terminal 130, and the storage 140 may be combined with or part of the image processing device 120 as a single device. Similar modifications should fall within the scope of the present disclosure.

Figure 2:
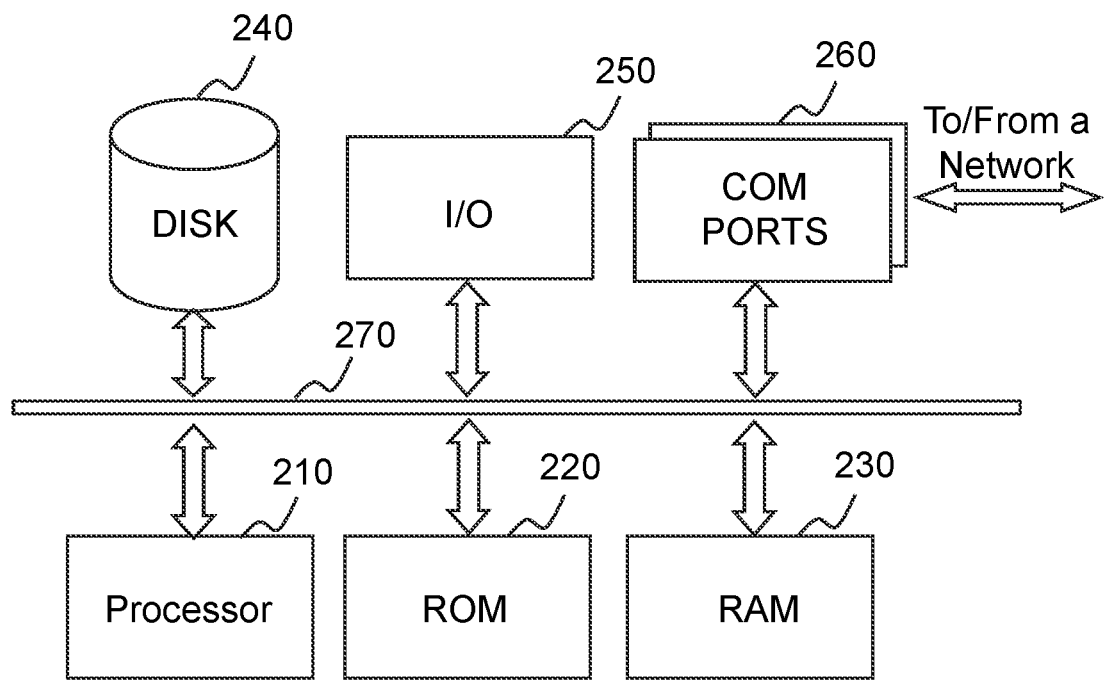
FIG. 2 is schematic diagram illustration exemplary hardware and/or software components of an exemplary computing device according to some embodiments of the present disclosure.

FIG. 2 is a schematic diagram illustrating exemplary hardware and/or software components of an exemplary computing device according to some embodiments of the present disclosure. The image processing device 120 and/or the terminal 130 may be implemented using one or more computing devices 200 and/or one or more portions of computing devices 200.

The computing device 200 may be used to implement any part of the data transmission as described herein. For example, the image processing device 120 may be implemented on the image processing device 200, via its hardware, software program, firmware, or a combination thereof. Although only one such computer is shown, for convenience, the computer functions relating to the image processing as described herein may be implemented in a distributed fashion on a number of similar platforms, to distribute the processing load.

The computing device 200, for example, may include COM ports 250 connected to and from a network connected thereto to facilitate data communications. The computing device 200 may also include a processor 210, in the form of one or more processors, for executing program instructions. The exemplary computer platform may include an internal communication bus 270, a program storage and data storage of different forms, such as, and a read only memory (ROM) 220, a random access memory (RAM) 240, or a disk 240, for various data files to be processed and/or transmitted by the computer. The exemplary computer platform may also include program instructions stored in the ROM 220, RAM 230, and/or any other type of non-transitory storage medium to be executed by the processor 210. The methods and/or processes of the present disclosure may be implemented as the program instructions. The computing device 200 also includes an I/O component 250, supporting input/output between the computing device 200 and outside components. The computing device 200 may also receive programming and data via network communications.

The processor 210 may execute instructions and/or data to perform one or more functions described in the present disclosure. For example, the processor 210 may determine a tilt angle of a license plate of a vehicle in an image. In some embodiments, the processor 210 may include one or more processors (e.g., single-core processor(s) or multi-core processor(s)). Merely by way of example, the processor 210 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

Merely for illustration, only one processor 210 is described in the computing device 200. However, it should be noted that the computing device 200 in the present disclosure may also include multiple processors, thus operations and/or method steps that are performed by one processor 210 as described in the present disclosure may also be jointly or separately performed by the multiple CPUs/processors. For example, if in the present disclosure the processor 210 of the computing device 200 executes both step A and step B, it should be understood that step A and step B may also be performed by two different CPUs/processors jointly or separately in the computing device 200 (e.g., the first processor executes step A and the second processor executes step B, or the first and second processors jointly execute steps A and B).

The ROM 220, the RAM 230, and/or the disk 240 may store data and/or instructions that may perform one or more functions described in the present disclosure. For example, the ROM 220, the RAM 230, and/or the disk 240 may store instructions executed by the processor 210 to determine whether a visible light image and an infrared image relating to a same scene are registered. As another example, the ROM 220, the RAM 230, and/or the disk 240 may store instructions executed by the processor 210 to recognize a license plate of a vehicle in an image. In some embodiments, the RAM 230 may include a dynamic RAM (DRAM), a double date rate synchronous dynamic RAM (DDR SDRAM), a static RAM (SRAM), a thyristor RAM (T-RAM), and a zero-capacitor RAM (Z-RAM), or the like, or any combination thereof. In some embodiments, the ROM 220 may include a mask ROM (MROM), a programmable ROM (PROM), an erasable programmable ROM (EPROM), an electrically-erasable programmable ROM (EEPROM), a compact disk ROM (CD-ROM), and a digital versatile disk ROM, or the like, or any combination thereof. In some embodiments, the disk 240 may include a magnetic disk, an optical disk, a solid-state drive, a flash drive, a floppy disk, an optical disk, a memory card, a zip disk, a magnetic tape, or the like, or any combination thereof. In some embodiments, the ROM 220, the RAM 230, and/or the disk 240 may include a data storage, an application, etc. In some embodiments, the data storage may be any hardware or software for storing data, including a circuitry, a program, etc. In some embodiments, the application may include any application that may be installed in the computing device 200 for querying data.

The I/O 250 may support an input/output between the computing device 200 and an outside component. Merely by way of example, the I/O 250 may include a display, a keypad/keyboard, or the like, or any combination thereof. The display may be an output device for presenting information in visual form. In some embodiments, the display may include a liquid crystal display (LCD) panel, a light emitting diode display (LED) panel, an organic light emitting diodes (OLED) panel, a cathode ray tube (CRT) display, a plasma display, a touchscreen, a simulated touchscreen, the like, or any combination thereof. The keypad/keyboard may be an input device for typing in information from a user. In some embodiments, the keypad/keyboard may include a standard alphanumeric keyboard, a simplified alphanumeric keyboard, a flexible keyboard, a handheld keyboard, a software keyboard, an on-screen keyboard, a laser projection keyboard, a sense board, or the like, or any combination thereof.

The COM ports 260 may be connected to a network to facilitate data communications. In some embodiments, the COM ports 260 may be an interface with the network 150 and/or one or more components in the license plate recognition system 100. In some embodiments, the COM ports 260 may be any type of wired or wireless network interface. Merely by way of example, the COM ports 260 may include a cable network interface, a wireline network interface, an optical fiber network interface, a telecommunications network interface, an intranet interface, an internet interface, a local area network (LAN) interface, a wide area network (WAN) interface, a wireless local area network (WLAN) interface, a metropolitan area network (MAN) interface, a wide area network (WAN) interface, a public telephone switched network (PSTN) interface, a Bluetooth network interface, a ZigBee network interface, a near field communication (NFC) network interface, or the like, or any combination thereof. In some embodiments, the COM ports 260 may be implemented according to programming and/or computer language(s). The COM ports 260 may include circuitry for coupling the computing device 200 to one or more networks, and is constructed for use with one or more communication protocols and technologies including, global system for mobile communications (GSM), code-division multiple access (CDMA), time-division multiple access (TDMA), general packet radio service (GPRS), enhanced data rate for GSM evolution (EDGE), wideband code division multiple access (WCDMA), high speed downlink packet access (HSDPA), long term evolution (LTE), user datagram protocol (UDP), transmission control protocol/Internet protocol (TCP/IP), short message service (SMS), wireless application protocol (WAP), ultra wide band (UWB), IEEE 802.16 worldwide interoperability for microwave access (WiMax), session initiated protocol/real-time transport protocol (SIP/RTP), or any of a variety of other wireless communication protocols.

The internal communication bus 270 may transfer information and/or data between one or more components of the computing device 200. For example, the internal communication bus 270 may connect the processor 210 with a storage (e.g., the RAM 230, the ROM 220, etc.) for exchanging information and/or data. In some embodiments, the internal communication bus 270 may include a hardware component and/or a software implementation. For example, the internal communication bus 270 may include a wire, an optical fiber, a cable, a communication protocol, or the like, or any combination thereof.

Figure 3:
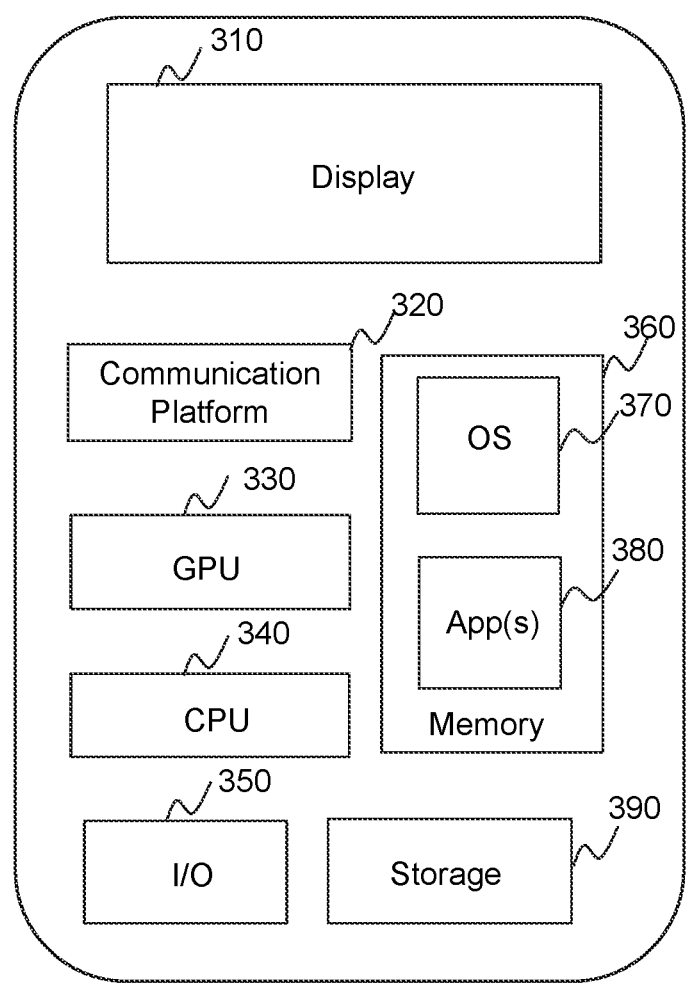
FIG. 3 is a schematic diagram illustrating exemplary components of an exemplary user device according to some embodiments of the present disclosure.

FIG. 3 is a schematic diagram illustrating exemplary components of an exemplary user device according to some embodiments of the present disclosure. As illustrated in FIG. 3, the user device 300 may include a communication platform 320, a display 310, a graphic processing unit (GPU) 330, a central processing unit (CPU) 340, an I/O port 350, a memory 360, and a storage 390. In some embodiments, any other suitable component, including but not limited to a system bus or a controller (not shown), may also be included in the user device 300. In some embodiments, a mobile operating system 370 (e.g., iOS™, Android™, Windows Phone™) and one or more applications 380 may be loaded into the memory 360 from the storage 390 in order to be executed by the processor 340. The user device 300 may be an embodiment of the terminal 130. The applications 380 may include an image player for receiving and displaying an image provided by the imaging device 110 through the network 150.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a server if appropriately programmed.

Figure 4:
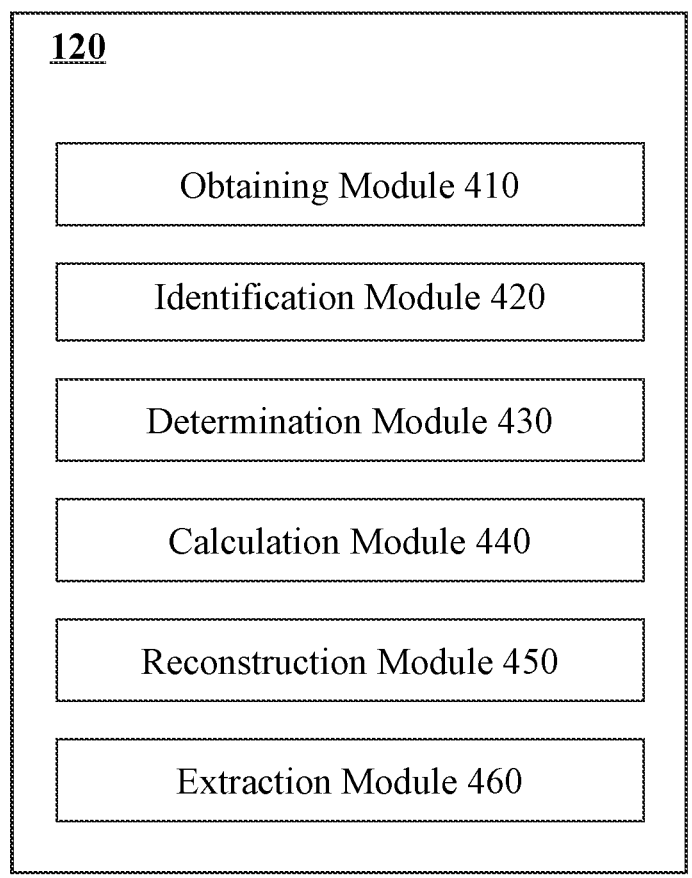
FIG. 4 is a block diagram of an exemplary image processing device according to some embodiments of the present disclosure.

FIG. 4 is a block diagram of an exemplary image processing device 120 according to some embodiments of the present disclosure. The image processing device 120 may include an obtaining module 410, an identification module 420, a determination module 430, a calculation module 440, a reconstruction module 450, and an extraction module 460.

The obtaining module 410 may obtain an image from other components of the license plate recognition system 100. The obtained image may include a vehicle with a license plate mounted on it.

The identification module 420 may identify one or more feature points in an image. For example, the identification module 420 may identify one or more feature point in an image of a vehicle including, a center point of a license plate of the vehicle, a boundary point of the vehicle, etc. In some embodiments, the identification module 420 may identify the region of the license plate and further identify the center point of the license plate as well as other feature points of the license plate.

The determination module 430 may determine a tilt angle of a license plate in an image of a vehicle. In some embodiments, the determination module 430 may determine an approximate tilt angle of the license plate based on one or more feature points associated with the vehicle. Further, the determination module 430 may determine an angle range that covers the approximate tilt angle of the license plate. The angle range may be further used to determine the (exact) tilt angle of the license plate.

The calculation module 440 may determine a tilt angle of a license plate. In some embodiments, the calculation module 440 may select a plurality of candidate angles from an angle range, and rotate the license plate by each of the plurality of candidate angles. After each rotation, the calculation module 440 may calculate a parameter value associated with a plurality of reference points of the license plate and designate one candidate angle as the tilt angle of the license plate based on the plurality of parameter values. In some embodiments, the parameter value may be a variance of a plurality of projection points that are projected by the plurality of reference points of the license plate.

The reconstruction module 450 may reconstruct an image or a portion thereof. For example, the reconstruction module 450 may reconstruct a license plate in an image of a vehicle by resizing the license plate (e.g., adjusting the width/height of the license plate). In some embodiments, the reconstruction module 450 may also perform a judgement of whether the image or a portion thereof needs to be reconstructed.

The extraction module 460 may extract information from a license plate. The information of the license plate may include the characters in the license plate that indicates the identification of a vehicle. In some embodiments, the extraction module 460 may extract the characters in the license plate by an Optical Character Recognition (OCR) technique or a license plate character recognition (LPCR) algorithm by using, for example, a neural network.

FIG. 5 is a flow chart illustrating an exemplary process 500 for license plate recognition according to some embodiments of the present disclosure. The process 500 may be executed by the license plate recognition system 100. For example, the process 500 may be implemented as a set of instructions stored in the storage ROM 220 or RAM 230. The processor 210 and/or the modules in FIG. 4 may execute the set of instructions, and when executing the instructions, the processor 210 and/or the modules may be configured to perform the process 500. The operations of the illustrated process presented below are intended to be illustrative. In some embodiments, the process 500 may be accomplished with one or more additional operations not described and/or without one or more of the operations discussed. Additionally, the order in which the operations of the process 500 as illustrated in FIG. 5 and described below is not intended to be limiting.

In 510, the obtaining module 410 may obtain an image including a vehicle having a license plate. In some embodiments, the image may be received from any suitable storage device (e.g., the storage 140 illustrated in FIG. 1, the DISK 240 illustrated in FIG. 2, the storage 390 illustrated in FIG. 3), any suitable imaging device (e.g., the imaging device 110 illustrated in FIG. 1), or any terminal device (e.g., the terminal 130).

The vehicle may include a car, a bus, a truck, etc. The license plate may be mounted on the front and/or the back of the vehicle. The license plate may be a rectangular plate with a numeric or alphanumeric ID of the vehicle. The license plate may have a background color (e.g., blue, green, white) that is different from the color of the numeric or alphanumeric ID.

In some embodiments, due to various views of the vehicle in the image, the license plate presented in the image may be subject to a deformation. For example, the license plate presented in the image may be oblique, and/or the shape of the license plate presented in the image may have the shape of a diamond. For brevity, the deformation of the license plate presented in the image may be indicated by a tilt angle of the license plate. The tilt angle of the license plate may depend on the orientation of the vehicle in the image. In the case when the vehicle is presented in the image with its front view, the license plate as well as the numeric or alphanumeric ID on the license plate may be horizontally positioned in the image, and thus the tilt angle of the license plate may be regarded as 0.

In some embodiments, the vehicle presented in the image may be included in a reference zone. The reference zone may be represented by a box with a specific shape, such as, a rectangular box, a circular box, an oval box. In some embodiment, the reference zone may be generated by a vehicle recognition process. In some embodiments, the reference zone may be determined manually.

In 520, the feature identification module 420 may identify at least one feature point associated with the vehicle. The at least one feature point may include one or more points (pixels) of a specific part (e.g. a headlight, a back light, a rear-view mirror, a tyre, the logo, the front windshield, the back windshield, the license plate) of the vehicle in the image. For example, the at least one feature point may include a point of a headlight (e.g., the center point of the headlight, an edge point of the headlight), a point of a rear-view mirror (e.g., an edge point of the rear-view mirror), an edge point of the head of the vehicle, a point of the logo of the vehicle, etc. The identification of the at least one feature point associated with the vehicle may be further used to determine, for example, the orientation of the vehicle, and/or the tilt angle of the license plate.

In some embodiments, the identification of the at least one feature point may be performed by various techniques including an edge detection technique, a color-based technique, a machine learning technique, a texture-based technique, or the like, or any combination thereof. For example, the edge detection technique may be utilized to detect the left/right boundary of the head of the vehicle. The color-based technique may be utilized to detect the license plate that has a distinctive color in the image. The texture-based technique may be utilized to detect the license plate with a distinctive pattern in the image. The machine learning technique may be utilized to detect an object of interest via a trained network, e.g., a convolutional neural network (CNN). The object of interest may include the logo of the vehicle, the license plate of the vehicle, the headlight of the vehicle, etc. More descriptions of the identification of a feature point may be found elsewhere in the present disclosure (e.g., FIG. 6 and the description thereof).

In 530, the determination module 430 may determine, based on the at least one feature point, an angle range of the license plate. The angle range of the license plate may be an approximate range within which the tilt angle of the license plate may be located.

The angle range of the license plate may relate to the orientation of the vehicle in the image. For example, if the vehicle faces towards the right side of the image, the license plate in the image may tilt to the top right of the image (e.g., the license plate in FIG. 8C), and thus the angle range of the license plate may be within the range of 0 degree to 90 degrees. If the vehicle faces towards the left side of the image, the license plate in the image may tilt to the top left of the image (e.g., the license plate in FIG. 8B), and thus the angle range of the license plate may be within the range of −90 degrees to 0 degree.

In some embodiments, in order to determine the angle range of the license plate, the determination module 430 may first determine a reference angle $\theta$ of the license plate based on the at least one feature point. The reference angle $\theta$ may be an approximate tilt angle of the license plate.

As described elsewhere in the present disclosure, the at least one feature point may include one or more points of a specific part of the vehicle in the image. For illustration purpose, the description of the determination of the reference angle $\theta$ of the license plate may take one or more feature points of the license plate as an example. It should be noted that the determination of the reference angle $\theta$ of the license plate below are merely some examples or implementations. For persons having ordinary skills in the art, the determination of the reference angle $\theta$ of the license plate may be performed according to other feature points, such as, one or more feature points of the logo of the vehicle.

In some embodiments, the one or more feature points of the license plate may include the center point of the license plate. The determination module 430 may determine a first horizontal distance between the center point of the license plate and the left boundary of the head of the vehicle, and a second horizontal distance between the center point of the license plate and the right boundary of the head of the vehicle. The left/right boundary of the head of the vehicle may be defined with different representations in different scenarios. For example, the left/right boundary of the head of the vehicle may be defined with the center/edge point of the left/right headlight of the vehicle, provided that the left/right headlight can be detected in the image. As another example, the left/right boundary of the head of the vehicle may be defined with the outermost point of the head of the vehicle, provided that the left/right headlight cannot be detected in the vehicle. For brevity, the first horizontal distance may be denoted as $\Delta L_l$, and the second horizontal distance may be denoted as $\Delta L_r$. If the first horizontal distance is greater than the second horizontal distance, the determination module 430 may determine that the vehicle faces towards the right side of the image. If the first horizontal distance is smaller than the second horizontal distance, the determination module 430 may determine that the vehicle faces towards the left side of the image.

Further, the determination module 430 may calculate the reference angle $\theta$ of the license plate based on the first horizontal distance and the second horizontal distance according to formula (1).

$$\theta = f(\Delta L_l, \Delta L_r), \quad (1)$$

where f is a function that indicates the relation between the first horizontal distance, the second horizontal distance, and the reference angle $\theta$ of the license plate. Specifically, the relation among the first horizontal distance, the second horizontal distance, and the reference angle $\theta$ of the license plate may be denoted as a mapping relation between a ratio of the first horizontal distance to the second horizontal distance, i.e., $\Delta L_l / \Delta L_r$, and the reference angle $\theta$ of the license plate according to formula (2).

$$\theta = f(\Delta L_l / \Delta L_r) \quad (2)$$

In some embodiments, the function f may be predetermined and stored in a storage device (e.g., the storage 140) of the license plate recognition system 100. In some embodiments, the function f may be a neural network model. When the first horizontal distance $\Delta L_l$ and the second horizontal distance $\Delta L_r$ are input into the neural network model, the reference angle θ may be generated as the result of the neural network model.

In some embodiments, the one or more feature points of the license plate may include multiple points of the license plate. The multiple points of the license plate may include one or more corner points of the license plate including the top left corner point, the top right corner point, the bottom left corner point, and the bottom right corner point of the license plate. The determination module 430 may determine the orientation of the vehicle in the image and/or the reference angle θ of the license plate based on the position information of the multiple points of the license plate. For example, the determination module 430 may determine the vertical coordinates of the top left corner point and the top right corner point of the license plate. If the vertical coordinate of the top left corner point is greater than the vertical coordinate of the top right corner point, the determination module 430 may determine that the vehicle faces towards the left side of the image. If the vertical coordinate of the top left corner point is smaller than the vertical coordinate of the top right corner point, the determination module 430 may determine that the vehicle faces towards the right side of the image. Further, the determination module 430 may calculate an included angle between the horizontal direction and the line connecting the top left corner point and the top right corner point of the license plate, and calculate the reference angle θ of the license plate based on a mapping relation between the reference angle θ and the included angle.

After the reference angle θ of the license plate is determined, the determination module 430 may further determine the angle range of the license plate. The angle range of the license plate may be set such that the reference angle θ may be included in it. In some embodiments, the angle range of the license plate may be set to be $(\theta-\Delta\theta, \theta+\Delta\theta)$ such that the reference angle θ may be the median of the angle range. $\Delta\theta$ may be any value, such as, 5°, 8°, 10°, 20°, 30°, etc.

In 540, the calculation module 440 may determine a tilt angle of the license plate within the angle range. In some embodiments, the calculation module 440 may select a plurality of candidate angles within the angle range and determine a confidence score associated with each of the plurality of candidate angles. Then, the calculation module 440 may designate the candidate angle whose confidence score satisfies a condition as the tilt angel of the license plate. In some embodiments, the calculation module 440 may rotate the license plate by a selected candidate angle, and determine the confidence score associated with the selected candidate angle based on the distribution of the points of the rotated license plate. Specifically, the confidence score associated with the selected candidate angle may be represented by a variance of the coordinates of the points of the rotated license plate, or a variance of the coordinates of projected points that are projected by the points of the rotated license plate. More descriptions regarding the determination of the tilt angle of the license plate may be found elsewhere in the present disclosure, e.g., FIG. 8 and the description thereof.

In 550, the calculation module 440 may perform a tilt correction on the license plate based on the tilt angle.

The tilt correction may include rotating the license plate by the tilt angle. In some embodiments, after rotation, the left boarder and the right boarder of the license plate may be parallel to or substantially parallel to the vertical direction. In some embodiments, after rotation, the upper boarder and the lower boarder of the license plate may be parallel to or substantially parallel to the horizontal direction. In some embodiments, the tilt correction may include an interpolation operation (e.g., a bilinear interpolation) to calculate a point value in the tilted license plate.

Additionally or alternatively, the tilt correction may include performing a shear transformation (e.g., a horizontal shear, a vertical shear) on the rotated license plate. For example, the calculation module 440 may perform a horizontal shear on the rotated license plate whose upper boarder and lower boarder are parallel to or substantially parallel to the horizontal direction. As another example, the calculation module 440 may perform a vertical shear on the rotated license plate whose left boarder and right boarder are parallel to or substantially parallel to the vertical direction. As still another example, the calculation module 440 may perform a shear mapping operation on the rotated license plate according to a specific shear matrix.

In some embodiments, after the tilt correction, the corrected license plate may have the shape of a rectangle, or the like.

In 560, the reconstruction module 450 may determine whether a reconstruction of the corrected license plate is needed. As used herein, the reconstruction of the corrected license plate may refer to an operation to adjust one or more parameters of the corrected license plate to generate a reconstructed license plate. In some embodiments, the reconstructed license plate may facilitate the subsequent processing(s) on the license plate (e.g., recognizing the characters in the license plate). The adjusted one or more parameters of the corrected license plate may include, for example, the resolution of the corrected license plate, the size of the corrected license plate, or the like, or a combination thereof.

In some embodiments, the reconstruction module 450 may determine whether to reconstruct the corrected license plate based on the width of the corrected license plate and/or the ratio of the width to the height of the reconstructed license plate. For example, if the ratio of the width to the height of the reconstructed license plate is less than a threshold r, and the width of the license plate is less than a threshold w, the reconstruction module 450 may determine that the license plate needs to be reconstructed. Otherwise, the reconstruction module 450 may determine that the license plate does not need to be reconstructed. The threshold r and/or the threshold w may be predetermined and stored in a storage device (e.g., the storage 140) of the license plate recognition system 100. In response to the determination that the reconstruction of the corrected license plate is needed, the process 500 may proceed to 570; otherwise, the process 500 may proceed to 580.

In 570, the reconstruction module 450 may perform the reconstruction of the corrected license plate. In some embodiments, the reconstruction module 450 may employ various reconstruction techniques including, for example, a super-resolution reconstruction (SR) technique, a maximum a posteriori (MAP) based technique, or the like, or any combination thereof. In some embodiments, the reconstruction of the corrected license plate may include adjusting the ratio of the width to the height of the reconstructed license plate by, for example, enlarging the width of the corrected license plate. Under different scenarios, the width of the corrected license plate may be enlarged by 0.5, 1, 1.5, etc., times.

In 580, the extraction module 460 may extract information of the license plate from the acquired license plate (the corrected license plate or the reconstructed license plate). The information of the license plate may include the characters in the license plate that indicates the identification of the vehicle. In some embodiments, the characters in the license plate may be extracted by an Optical Character Recognition (OCR) technique. In some embodiments, the characters in the license plate may be extracted by a license plate character recognition (LPCR) algorithm by using, for example, a neural network.

It should be noted that the above description of process 500 is merely provided for the purposes of illustration, and not intended to be understood as the only embodiment. For persons having ordinary skills in the art, various variations and modifications may be conduct under the teaching of some embodiments of the present disclosure. In some embodiments, some operations may be reduced or added. However, those variations and modifications may not depart from the protecting of some embodiments of the present disclosure. For example, one or more other optional operations (e.g. pre-processing operation) may be added in the process 500. For example, the identification module 420 may preprocess the image (e.g., enhance the contrast of the image) before identifying the feature(s) associated with the vehicle.

Figure 6:
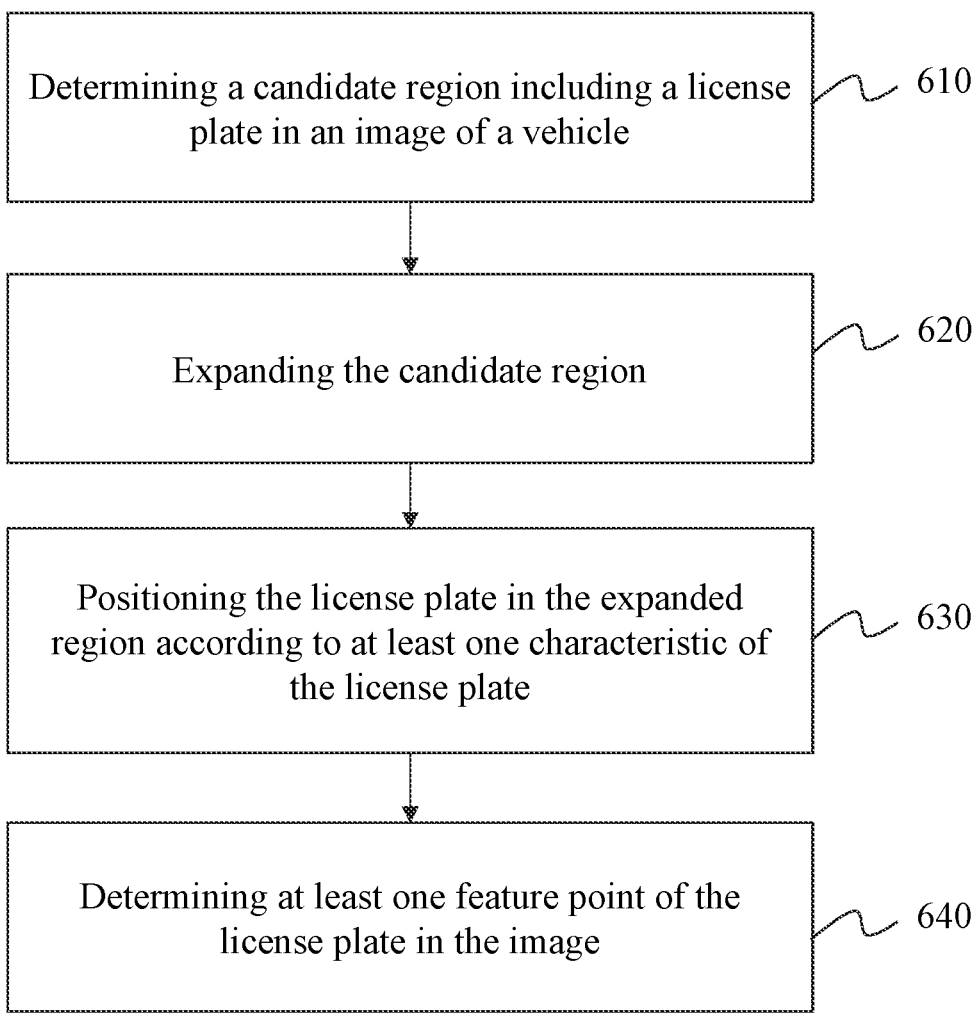
FIG. 6 is a flow chart illustrating an exemplary process for determining at least one feature point of a license plate according to some embodiments of the present disclosure.

FIG. 6 is a flow chart illustrating an exemplary process 600 for feature point identification according to some embodiments of the present disclosure. The process 600 may be executed by the license plate recognition system 100. For example, the process 600 may be implemented as a set of instructions stored in the storage ROM 220 or RAM 230. The processor 210 and/or the modules in FIG. 4 may execute the set of instructions, and when executing the instructions, the processor 210 and/or the modules may be configured to perform the process 600. The operations of the illustrated process presented below are intended to be illustrative. In some embodiments, the process 600 may be accomplished with one or more additional operations not described and/or without one or more of the operations discussed. Additionally, the order in which the operations of the process 600 are performed as illustrated in FIG. 6 and described below is not intended to be limiting. In some embodiments, the operation 520 in the process 500 may be performed according to the process 600.

In 610, the identification module 420 may determine a candidate region associated with a license plate in an image of a vehicle. The candidate region may be an approximate representation of the license plate that indicates an approximate position, an approximate shape, etc., of the license plate in the image. In some embodiments, the identification module 420 may determine the candidate region via a morphology-based technique, a neural network technique (e.g. a trained Darknet model), an object segmentation technique (e.g., an edge-based technique), or the like, or any combination thereof.

In 620, the identification module 420 may expand the candidate region such that the license plate may be completely included in the expanded region. In some embodiments, the candidate region may be expanded according to one or more boundary points of the candidate region. A boundary point of the candidate region may be the point with at least one of: the maximum horizontal coordinate, the minimum horizontal coordinate, the maximum vertical coordinate, or the minimum vertical coordinate in the candidate region. Then, the identification module 420 may expand the candidate region to cover all the points whose horizontal coordinates are within the range between the maximum horizontal coordinate and the minimum horizontal coordinate, and vertical coordinates are within the range between the maximum vertical coordinate and the minimum vertical coordinate. In some embodiments, the candidate region may be expanded according to a user input that indicates the area of the expanded region.

In 630, the identification module 420 may position the license plate in the expanded region according to at least one characteristic of the license plate. The at least one characteristic of the license plate may include the color of the license plate (e.g. the color of the characters in the license plate, the background color of the license plate), the edges of the license plate (e.g., the vertical edge line, the horizontal edge line), the texture of the license plate, or the like, or any combination thereof.

In some embodiments, to better position the license plate in the expanded region, a pre-processing operation may be performed on the image. For example, the image may be converted into a gray image via the pro-processing operation. Optionally, the noise in the gray image may be further reduced by a Median Filtering and the contrast of the gray image may be further enhanced by a histogram equalization. Then, the edges of the license plate may be extracted by an edge-based algorithm. Specifically, the edge-based algorithm may include identifying the horizontal/vertical lines in the gray image, and designating the prominent horizontal/vertical lines as the horizontal/vertical edge lines of the license plate.

In 640, the identification module 420 may determine at least one feature point of the license plate in the image.

In some embodiments, the at least one feature point of the license plate may include the center point of the license plate. In some embodiments, the at least one feature point of the license plate may include multiple points of the license plate. The multiple points of the license plate may include one or more corner points of the license plate including the top left corner point, the top right corner point, the bottom left corner point, and the bottom right corner point of the license plate. In some embodiments, the at least one feature point of the license plate may be further used to determine the orientation of the vehicle or the angle range of the license plate as described in the process 500.

It should be noted that the above description of process 600 is merely provided for the purposes of illustration, and not intended to be understood as the only embodiment. For persons having ordinary skills in the art, various variations and modifications may be conduct under the teaching of some embodiments of the present disclosure. In some embodiments, some operations may be reduced or added. However, those variations and modifications may not depart from the protecting of some embodiments of the present disclosure. For example, the feature point of other parts in the image other than the license plate may be similarly determined according to the process 600. The other parts in the image may include the logo of the vehicle, the front windshield of the vehicle, the back windshield of the vehicle, or the like, or any combination thereof. Further, the feature point of other parts may also be used to determine the orientation of the vehicle or the angle range of the license plate according to a similar process as the process 500.

FIG. 7 is a flow chart illustrating an exemplary process 700 for determining a tilt angle of a license plate according to some embodiments of the present disclosure. The process 700 may be executed by the license plate recognition system 100. For example, the process 700 may be implemented as a set of instructions stored in the storage ROM 220 or RAM 230. The processor 210 and/or the modules in FIG. 4 may execute the set of instructions, and when executing the instructions, the processor 210 and/or the modules may be configured to perform the process 700. The operations of the illustrated process presented below are intended to be illustrative. In some embodiments, the process 700 may be accomplished with one or more additional operations not described and/or without one or more of the operations discussed. Additionally, the order in which the operations of the process 700 are performed as illustrated in FIG. 8 and described below is not intended to be limiting. In some embodiments, the operation 540 may be performed according to the process 700.

In 710, the calculation module 440 may obtain an angle range of a license plate in an image. In some embodiments, the angle range may be an approximate tilt range within which the tilt angle of the license plate may be located.

In 720, the calculation module 440 may identify a plurality of reference points of the license plate. In some embodiments, the plurality of reference points may include one or more feature points of the license plate as described elsewhere in the present disclosure, e.g., the top left corner point, the top right corner point, the bottom left corner point, the bottom right corner point, and the center point of the license plate. Additionally or alternatively, the plurality of reference points may include one or more points of the characters in the license plate, such as the top point of each character in the license plate. Additionally or alternatively, the plurality of reference points may include one or more points of the edge line(s) of the license plate, such as the point of the upper edge line the license plate.

In some embodiments, the identification of the plurality of reference points may be performed by various techniques including an edge detection technique, a color-based technique, a machine learning technique, a texture-based technique, or the like, or any combination thereof.

In 730, the calculation module 440 may determine a plurality of projection points of the plurality of reference points for each of a plurality of candidate angles in the angle range.

The plurality of candidate angles in the angle range may be the points selected from the angle range randomly or according to a predetermined rule. For example, the plurality of candidate angles may be evenly distributed within the angle range. The angle difference between each adjacent candidate angles may be any value, such as, 0.5°, 1°, 1.5°, etc. For illustration purpose, assuming that the angle range is from 15° to 20° and the angle difference is 1°, the plurality of candidate angles may be 15°, 16°, 17°, 18°, 19° and 20°.

For each of the plurality of candidate angles, the calculation module 440 may rotate the license plate by that candidate angle, and then determine the plurality of projection points based on the plurality of reference points. In some embodiments, each projection point may be generated by projecting one of the plurality of reference points onto a line.

For brevity, the vertical line passing through the center point of the license plate may be described as an example. It should be noted that the line described below are merely an example or implementation. For persons having ordinary skills in the art, the vertical line may be replaced by any other suitable lines, such as the horizontal line passing through the center point of the license plate, or any other vertical lines parallel to the vertical line passing through the center point.

Figures 9A, 9B:
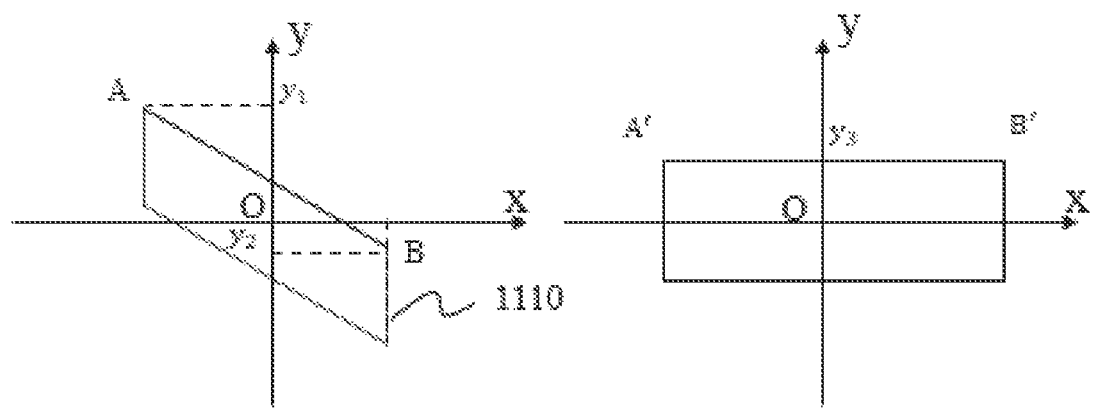
FIGS. 9A and 9B are schematic diagrams illustrating exemplary projection points of a license plate according to some embodiments of the present disclosure.

Referring to FIG. 9A, two points, A and B, are examples of two of the reference points of a tilted license plate 1110. The points A and B are the top left point and the top right point of the tilted license plate 1110, respectively. The y axis overlaps the line that passes through the center point of the tilted license plate 1110. In this case, after the calculation module 440 rotates the license plate 1110 by each of the plurality of candidate angles, the point A may be projected onto the y axis to generate its projection point $y_1$ on the axis, and the point B may be projected onto the y axis to generate its projection point $y_2$ on the y axis.

In 740, the calculation module 440 may determine a variance of the plurality of projection points for each of the plurality of candidate angles in the angle range. In some embodiments, the variance of the plurality of projection points may be represented by the variance of the positions of the plurality of projection points. For example, in the case that the projection points are generated by projecting the reference points onto the y axis, the variance of the plurality of projection points for a specific candidate angle may be represented by the variance of the vertical coordinates of the plurality of projection points. For example, as shown in FIG. 9A, the vertical coordinates of the plurality of projection points may include the vertical coordinates of the projection point $y_1$ and the projection point $y_2$.

In 750, the calculation module 450 may designate one of the plurality of candidates angles as a tilt angle of the license plate based on the plurality of variances. In some embodiments, the variance of the plurality of projection points may reflect the uniformity of the projection points. A smaller variance of the projection points may indicate a higher uniformity of the projection points, and thus a higher confidence score for the projection points. The calculation module 450 may determine the minimum variance among the plurality of variances, and designate the candidate angle corresponding to the minimum variance as the tilt angle of the license plate. For example, the FIG. 9B shows a license plate 1120 corresponding to the minimum variance. In FIG. 9B, the projection point of the top left point A' and the projection point of the top right point B' are both located at $y_3$ on the y axis, having a higher uniformity than the projection points $y_1$ and $y_2$ in FIG. 9A.

It should be noted that the above description of the process 700 is merely provided for the purposes of illustration, and not intended to be understood as the only embodiment. For persons having ordinary skills in the art, various variations and modifications may be conduct under the teaching of some embodiments of the present disclosure. In some embodiments, some operations may be reduced or added. However, those variations and modifications may not depart from the protecting of some embodiments of the present disclosure. In some embodiments, instead of determining the projection points of the plurality of reference points, the calculation module 440 may perform a curve fitting (e.g., a polynomial curve fitting) to the plurality of reference points for each candidate angle. For example, the calculation module 440 may fit the top points of the characters in the license plate to a linear line. The slope of the linear line may relate to the tilt angle of the license plate.

Figure 8A:
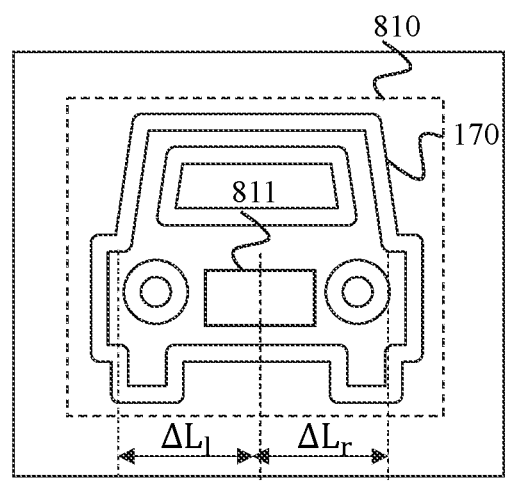
FIGS. 8A to 8C are schematic diagrams illustrating different tilt angles of a license plate according to some embodiments of the present disclosure.
Figure 8B:
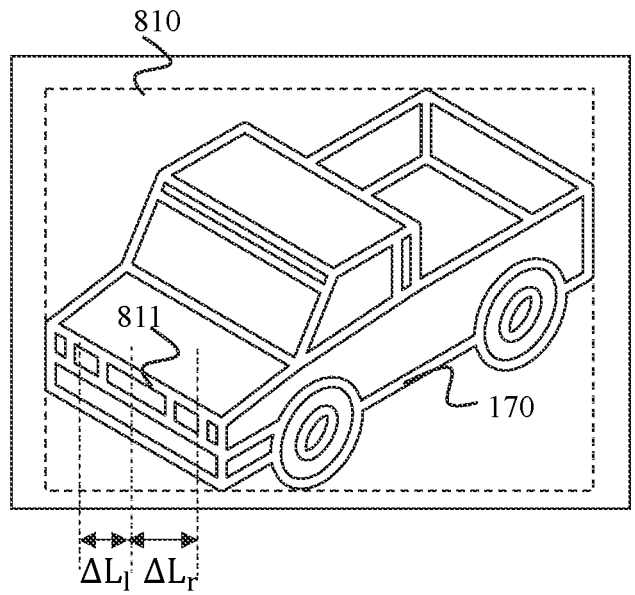
Figure 8C:
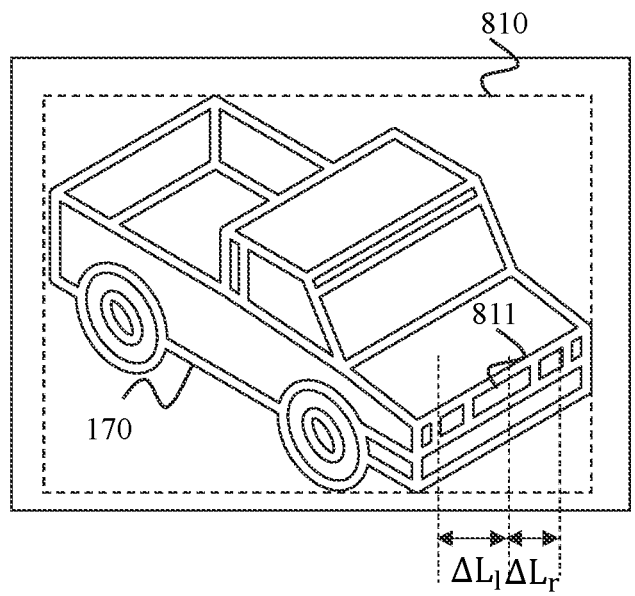

FIGS. 8A to 8C are schematic diagrams illustrating different tilt angles of a license plate according to some embodiments of the present disclosure.

In FIG. 8A, the vehicle 170 is presented with its front view, and the license plate 811 is horizontally positioned in the image. The vehicle 170 is included in a rectangular box 810 (i.e., a reference zone). The first horizontal distance $\Delta L_l$ is represented by the horizontal distance between the center point of the license plate 811 and the left boundary of the head of the vehicle. The second horizontal distance $\Delta L_r$ is represented by the horizontal distance between the center point of the license plate 811 and the right boundary of the head of the vehicle. In this case, the first horizontal distance is equal to the second horizontal distance, i.e., $\Delta L_l = \Delta L_r$.

In FIG. 8B, the vehicle 170 faces towards the left side of the image, and the license plate 811 tilts to the top left of the image. Different from FIG. 8A, the first horizontal distance is smaller than the second horizontal distance, i.e., $\Delta L_l < \Delta L_r$, and the tilt angle of the license plate 811 is within the range of −90 degrees to 0 degree.

In FIG. 8C, the vehicle 170 faces towards the right side of the image, and the license plate 811 tilts to the top right of the image. Different from FIGS. 8A and 8B, the first horizontal distance is greater than the second horizontal distance, i.e., $\Delta L_l > \Delta L_r$, and the tilt angle of the license plate 811 is within the range of 0 degree to 90 degrees.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "module," "unit," "component," "device," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claim subject matter lie in less than all features of a single foregoing disclosed embodiment.

We claim:

1. A system, comprising:
    at least one storage medium including a set of instructions; and
    at least one processor in communication with the at least one storage medium, wherein when executing the set of instructions, the at least one processor is directed to cause the system to:
        obtain an image including a license plate mounted on a vehicle;
        identify at least one feature point associated with the vehicle;

determine, based on the at least one feature point, an approximate angle range within which a tilt angle of the license plate is located;

determine, within the approximate angle range, the tilt angle of the license plate; and perform a tilt correction on the license plate based on the tilt angle of the license plate.

2. The system of claim 1, wherein the at least one feature point associated with the vehicle includes a first feature point located at the license plate and at least one second feature point located at the vehicle and outside the license plate.

3. The system of claim 2, wherein the first feature point located at the license plate includes a center point of the license plate.

4. The system of claim 2, wherein the at least one second feature point located at the vehicle and outside the license plate includes a second feature point at a left boundary of the vehicle and a second feature point at a right boundary of the vehicle.

5. The system of claim 2, wherein to determine, based on the at least one feature point, an approximate angle range within which a tilt angle of the license plate is located, the at least one processor is directed to cause the system to:

determine an approximate tilt angle based on a position relation between the first feature point and the at least one second feature point; and determine the approximate angle range based on the approximate tilt angle.

6. The system of claim 5, wherein the approximate tilt angle is the median of the approximate angle range.

7. The system of claim 1, wherein to determine, within the approximate angle range, the tilt angle of the license plate, the at least one processor is directed to cause the system to:

identify a plurality of reference points of the license plate;

determine, for each of a plurality of candidate angles in the approximate angle range, a parameter value associated with the plurality of reference points of the license plate; and designate, based on the plurality of parameter values, one of the plurality of candidate angles as the tilt angle of the license plate.

8. The system of claim 7, wherein the parameter value associated with the plurality of reference points of the license plate is a variance of a plurality of projection points that are projected by the plurality of reference points.

9. The system of claim 1, wherein the at least one processor is further directed to cause the system to:

in response to a determination that the license plate needs reconstruction, reconstruct the corrected license plate.

10. The system of claim 9, wherein the reconstruction of the corrected license plate includes an adjustment of a size of the corrected license plate.

11. A method implemented on a computing device including at least one processor and at least one storage medium, the method comprising:

obtaining an image including a license plate mounted on a vehicle;

identifying at least one feature point associated with the vehicle;

determining, based on the at least one feature point, an approximate angle range within which a tilt angle of the license plate is located;

determining, within the approximate angle range, the tilt angle of the license plate; and performing a tilt correction on the license plate based on the tilt angle of the license plate.

12. The method of claim 11, wherein the at least one feature point associated with the vehicle includes a first feature point located at the license plate and at least one second feature point located at the vehicle and outside the license plate.

13. The method of claim 12, wherein the first feature point located at the license plate includes a center point of the license plate.

14. The method of claim 11, wherein determining, within the approximate angle range, the tilt angle of the license plate comprises:

identifying a plurality of reference points of the license plate;

determining, for each of a plurality of candidate angles in the approximate angle range, a parameter value associated with the plurality of reference points of the license plate; and designating, based on the plurality of parameter values, one of the plurality of candidate angles as the tilt angle of the license plate.

15. The method of claim 14, wherein the parameter value associated with the plurality of reference points of the license plate is a variance of a plurality of projection points that are projected by the plurality of reference points.

16. The method of claim 11, further comprising:

in response to a determination that the license plate needs reconstruction, reconstructing the corrected license plate.

17. The method of claim 12, wherein the at least one second feature point located at the vehicle and outside the license plate includes a point of the left headlight of the vehicle and a point of the right headlight of the vehicle.

18. The method of claim 12, wherein determining, based on the at least one feature point, an approximate angle range within which a tilt angle of the license plate is located comprises: determining an approximate tilt angle based on a mapping relation between a ratio of a first horizontal distance to a second horizontal distance, wherein the first horizontal distance is between a center point of the license plate and a left boundary of the head of the vehicle, and the second horizontal distance is between the center point of the license plate and a right boundary of the head of the vehicle; and determining the approximate angle range based on the approximate tilt angle.

19. A non-transitory computer readable medium, comprising at least one set of instructions, when executed by one or more processors of a computing device, direct the computing device to perform a method, the method comprising:

obtaining an image including a license plate mounted on a vehicle;

identifying at least one feature point associated with the vehicle;

determining, based on the at least one feature point, an approximate angle range within which a tilt angle of the license plate is located;

determining, within the approximate angle range, the tilt angle of the license plate; and performing a tilt correction on the license plate based on the tilt angle of the license plate.

20. The method of claim 18, wherein the approximate tilt angle is the median of the approximate angle range.

* * * * *